INVENTOR
Pellegrino E. Napolitano

BY Stevens, Davis, Miller & Mosher
ATTORNEYS

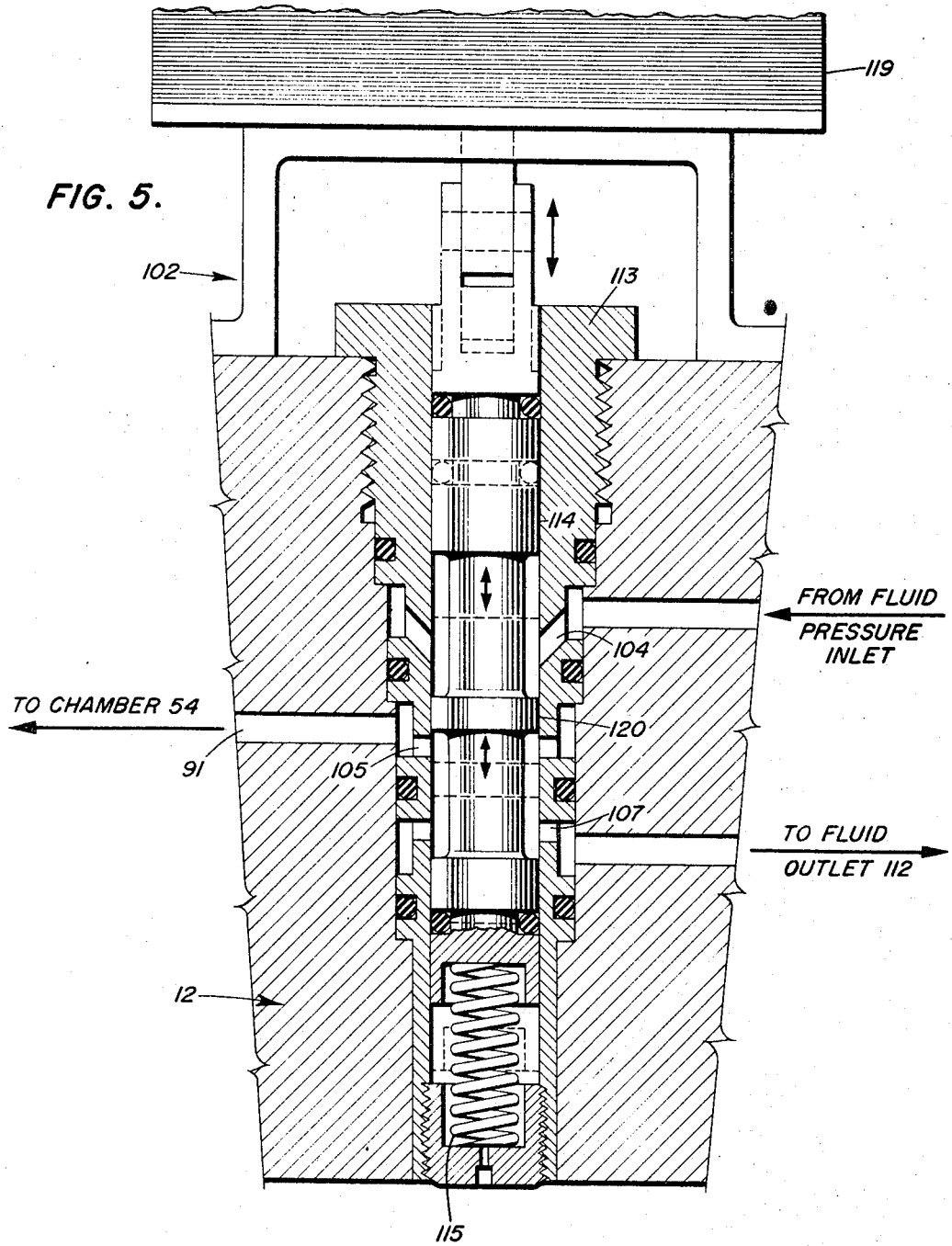

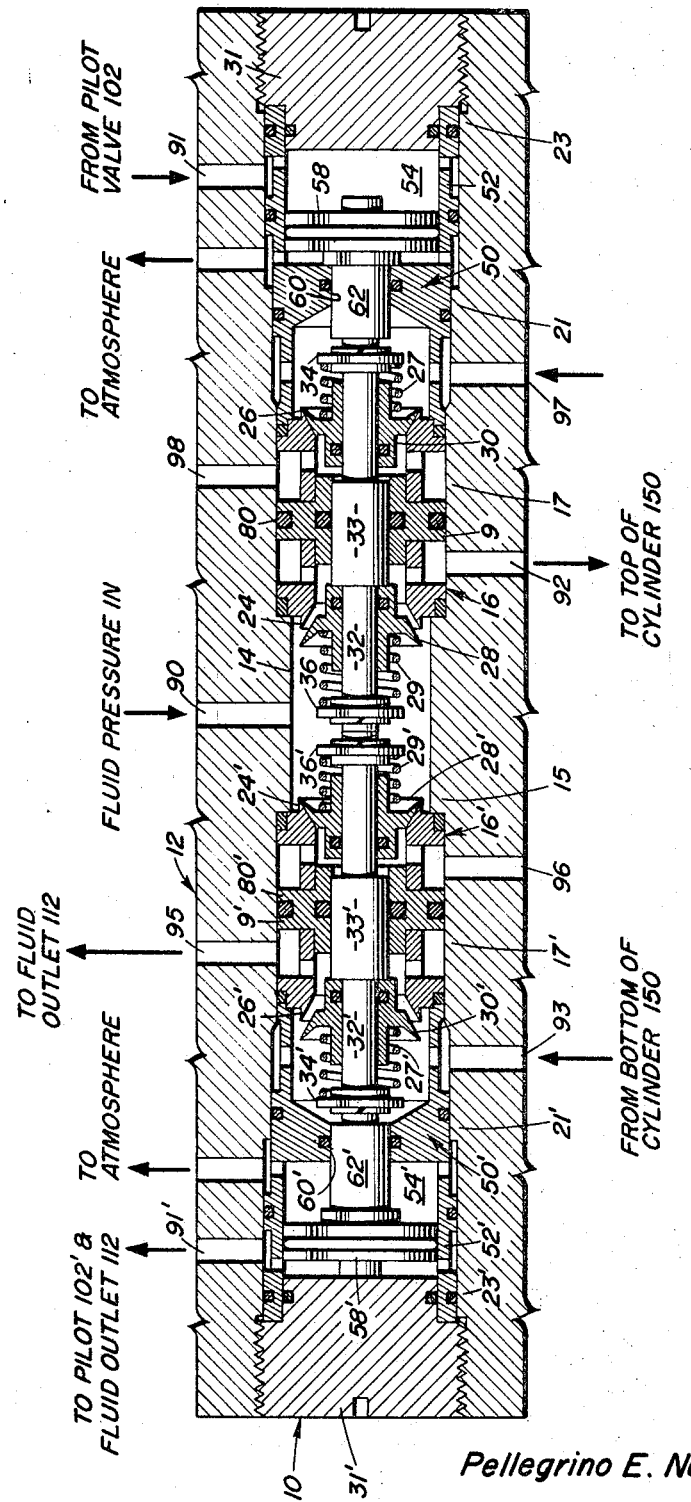

United States Patent Office 3,452,781
Patented July 1, 1969

3,452,781
FLUID CONTROL SYSTEM WITH ZERO LEAKAGE
Pellegrino E. Napolitano, 1415 57th St.,
Brooklyn, N.Y. 11234
Filed Aug. 29, 1966, Ser. No. 575,709
Int. Cl. F16k *5/08;* E03b *7/07*
U.S. Cl. 137—627.5               14 Claims

ABSTRACT OF THE DISCLOSURE

A spool-like valve rod is reciprocable in a valve bore. The rod carries a plurality of slidably-mounted valve elements which may be spring-biased against corresponding shoulders on the rod. The elements are conically shaped to complement valve seats in the bore. Upon moving the rod axially in one direction the shoulders push some of the elements from their seats and others remain by sliding on the rod. Upon reversal of movement the latter elements are moved from their seats while the former elements then seat. Fluid pressure in the bore coacts with the springs, if any, to place the elements sealingly on their seats, the elements having thin deflectable outer edges.

---

This invention relates to a control system involving the transfer of fluid flow from one circuit to another such as between the circuitry associated with the top and the bottom of fluid utilization devices or the like and, more particularly, to such a system possessing the characteristic of zero leakage.

Conventional fluid control systems involving the transfer of fluid flow from one circuit to another such as between the circuitry associated with the top and the bottom of a fluid cylinder or the like are highly susceptible to leakage.

The many joints between sections of tubing providing conduits as well as the various control valves utilized in such a system are all potential sources of leaks, with the principal source of leakage in such a system customarily being the fluid distributor valve.

Due to their simplicity of operation, fluid distributors of the slide-valve type have been generally preferred over all other types of fluid distributors.

Fluid distributors of the slide-valve type are usually formed as two units which slide with respect to each other, referred to as the body and slide-valve respectively.

A degree of fluid tightness between the two units is usually achieved by high mechanical precision or by providing the slide valve with a lining of rubber or the like. In the latter case, the distributors are limited to low pressure operation since the linings are rapidly damaged by their passage over orifices of the distributors. Even in the case where high mechanical precision is employed there are leakage problems, for in order to permit movement there must be some clearance provided, and, inherent with such clearance will be leakage.

The primary object of the present invention is to provide a fluid control system involving the transfer of fluid flow from one circuit to another in which there is no leakage from the system whatsoever.

Another object of the present invention is to eliminate all tubing and the joints associated therewith from a fluid control system, by providing a block or body having a plurality of cavities therein for the insertion of cartridge type elements used in a fluid control system and a plurality of bores providing conduits through the body connecting the cavities or the elements inserted therein.

Another object of the present invention is to provide a fluid control system requiring little maintenance and utilizing cartridge type elements which may be quickly removed and replaced in the system.

Another object of the present invention is to provide a fluid distributor device possessing all the advantages associated with distributor devices of the slide-valve type but which is exempt from the problem of leakage which is normally present in such devices.

Another object of the present invention is to provide a fluid control system wherein a control block forms the body for a fluid distributor of the slide-valve type.

Still another object of the present invention is to provide a distributor device in a fluid control system incorporating poppet valves instead of a slide, the poppets being arranged in such a configuration as to function as a slide, thus possessing all the non-leakage characteristics of the poppet valve in conjunction with the simplicity of operation for which the slide-valve is held in high esteem.

It is another object of the present invention to provide a leak-free fluid control system for selectively controlling the direction of fluid flow through a cylinder.

It is still another object of the present invention to provide pilot valves of a slide-valve configuration in a fluid control system wherein any leakage of fluid pressure is returned to the outlet of the system.

Other details, objects and advantages of the present invention will become apparent from the following description of the present embodiment thereof, taken in conjunction with the drawings which accompany and form part of the specification.

FIG. 5 is a vertical section of one of the pilot valves contained in one of the cavities of the block illustrated in FIG. 2.

FIG. 6 is an enlarged vertical section of the distributor device as shown in FIG. 1.

Figure 1:
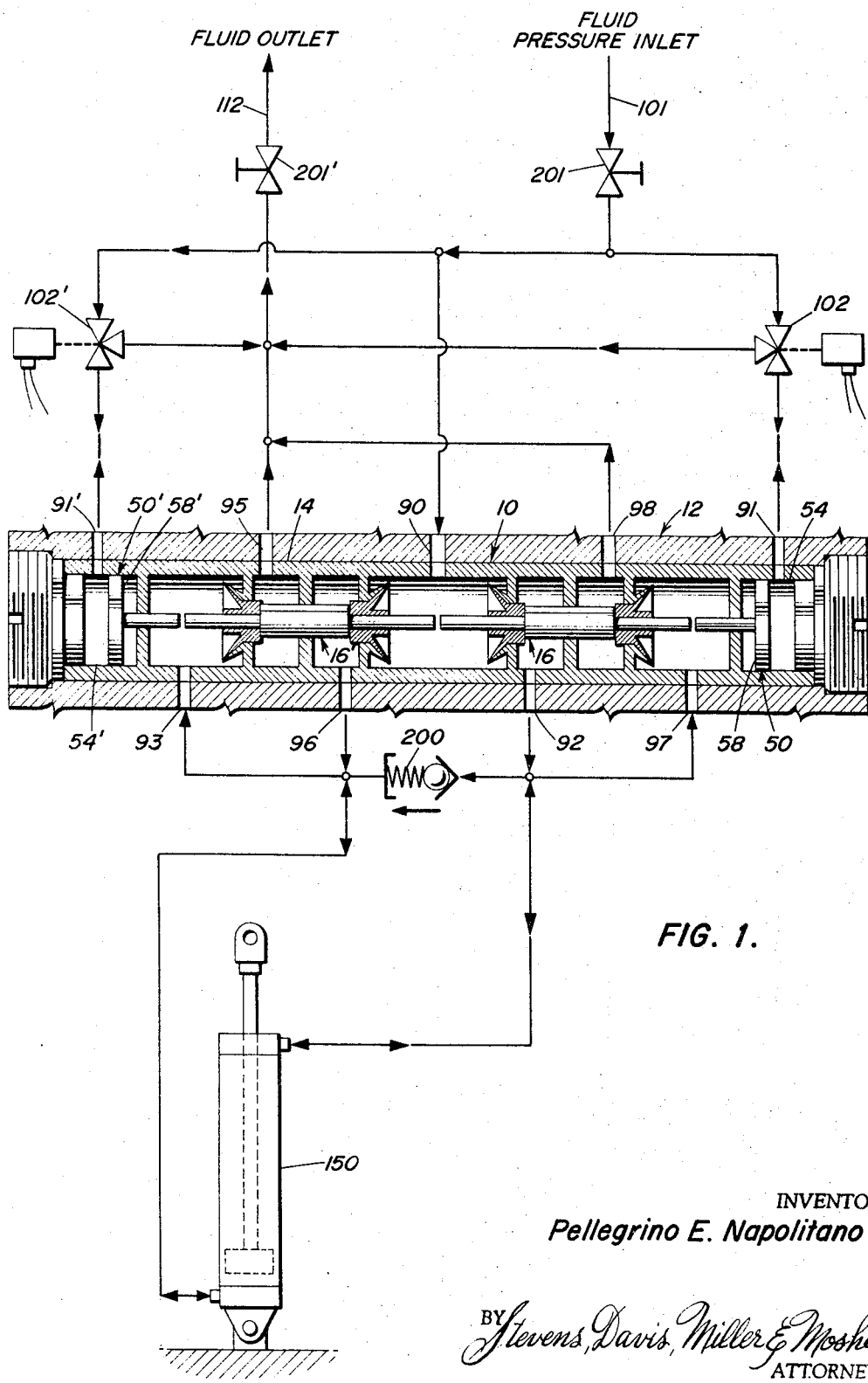
FIG. 1 is a circuit diagram of a fluid control system in accordance with the present invention, including a vertical section of the distributor device.

Referring to FIGURE 1 a circuit diagram of a fluid control system is illustrated which selectively controls the direction of fluid flow to a fluid utilization device such as a cylinder 150. Fluid pressure is applied from a pressure inlet 101 through a throttling valve 201 directly to a port 90 communicating with the center of a distributor device 10 and to two pilot valves 102 and 102' connected to actuation means located in respective ends of the distributor device 10. The pilot valves are selectively actuated so as to pass fluid pressure to actuating means in the ends of the distributor device 10, thereby controlling the opening and closing of the valves contained in the distributor device and, consequently, the particular path of fluid pressure flow from the port 90 to the top or bottom of a fluid utilization device such as cylinder 150 and the return path through the distributor for passing fluid from the fluid utilization device to a throttling valve 201' and a fluid output 112.

In order to facilitate the distinction of like elements in the distribution device, in the discussion thereof, identical elements on the left-hand side in the system are identified with the same numeral as on the right-hand side with the additional notation of a prime sign.

Figure 2:
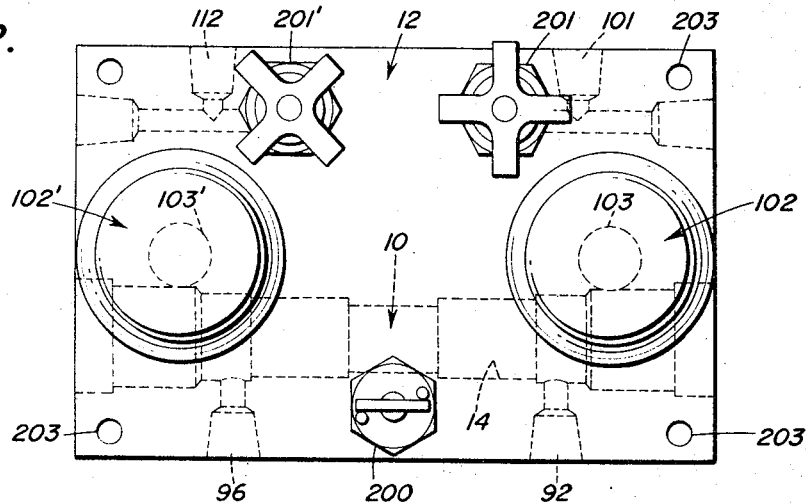
FIG. 2 is a plan view of a block in which the leak-free fluid control system of the present invention is provided.
Figure 3:
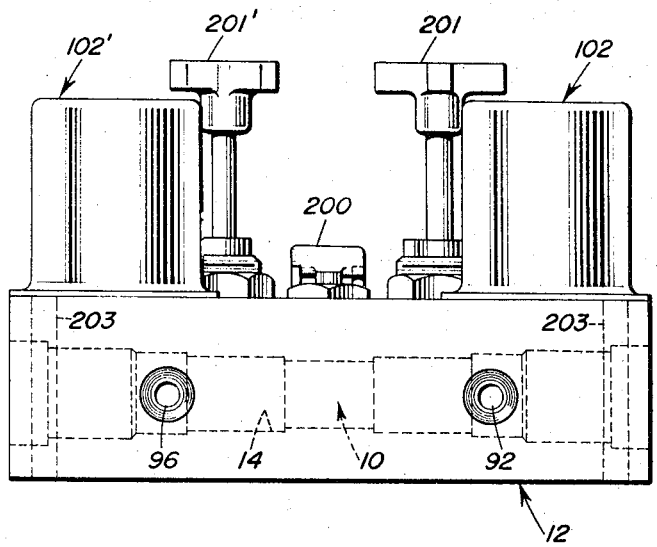
FIG. 3 is a front elevation of the block providing the leak-free fluid control system illustrated in FIG. 2.
Figure 4:
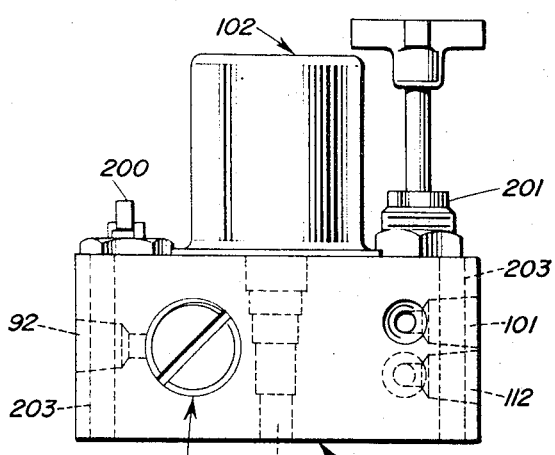
FIG. 4 is a side elevation view of the block embodying the leak-free fluid control system illustrated in FIG. 2.

As illustrated in FIGURES 2, 3, and 4, a block or body 12 which may be connected on one side of a fluid pressure source and a fluid pressure return, and on the other side to a fluid utilization device, incorporates all the elements of the control system of FIGURE 1 in a compact package. Inserted and sealed into the cavities in the top of the block or cavity 12 by threads or the like are throttling valves 201 and 201' pilot valves 102 and 102', and a relief by-pass valve 200. Extending through the side of the block or body 12 is a cavity into which the cartridges making up the distributor device 10 are inserted. Communicating with the various cavities in the body or block 12 and the cartridge elements inserted therein are a series of bores forming conduits in accordance with the circuitry illustrated in FIGURE 1. Apertures 203 are also provided through the block or body 10 for the insertion of mounting bolts, whereby the fluid control system may be conveniently mounted.

Referring now to the drawing in FIGURE 6 there is shown a distributor device indicated generally by the reference numeral 10. The distributor device is formed by a cylindrical hole or opening 14 bored in said block 12 and counterbored to provide a shoulder 15 at the middle, shoulders 17 and 17' on each side thereof, shoulders 21 and 21' adjacent to shoulders 17 and 17' respectively, and shoulders 23 and 23' adjacent to shoulders 21 and 21' respectively. Identical cartridge type valve assemblies 16 and 16' are mounted in the hole or opening 14 adjacent to the shoulder 15 and positioned on shoulders 17 and 17' respectively. Each of these valve assemblies has a pair of value seats 24 and 26 and a seal assembly 9 disposed therebetween. Valve seats 24 and 26 receive poppet valves 28 and 30. For further disclosure of a preferred poppet and seating assembly, see U.S. Patent 3,054,422.

Poppet valves 28 and 30 are slidably mounted on a shaft 32. A shoulder member 33 is provided in the center of said shaft and shoulders 34 and 36 are provided at the ends of said shaft to retain coil springs 27 and 29.

Positioned in said hole or opening 14 adjacent to and in contact with respective valve assemblies 16 and 16' are identical actuator assemblies 50 and 50' disposed to act in opposition to each other.

The housings 52 and 52' of said actuator assemblies have indentations which conform with corresponding shoulders in said hole or opening 14.

A cap 31 in each of said actuator assemblies locks said actuating assembly in said block or body 12 and forms an end of chamber 54 in which piston 58 is positioned. Attached to said piston 58 and extending through an aperture 60 in said chamber into contact with the shaft 32 is a shaft 62.

In general the distributor device 10 operates in the following manner. The body 12 has a port 90 communicating with and supplying fluid to the space located between the two valve assemblies 16 and 16'. Whether the fluid is connected to the top or bottom of cylinder 150 is dependent upon whether a control fluid pressure is applied through a port 91 in body 12 communicating with the interior of chamber 54 or is applied through a port 91' in body 12 communicating with the interior of chamber 54'.

When a control pressure is applied through port 91 into the interior of chamber 54, piston 58 moves to the left moving shafts 62, 32, 32' and 62' to the left. While the poppet valves are slideable along their respective shafts, the shoulder member 33 contacts poppet valve 28 unseating it from its valve seat 24, the shoulder member 33' contacts poppet valve 30' unseating it from its valve seat 26', the shoulder 34 compresses spring 27 holding poppet valve 30 closed against its seat 26, and shoulder 36' compresses spring 29' holding poppet valve 28' closed against its seat 24'. Piston 58' moved to the left by shaft 62' discharges fluid from chamber 54' through port 91' to the fluid outlet 112.

Fluid entering the distributor at port 90 flows around unseated valve 28 and through a port 92 to the top of cylinder 150. The return flow from cylinder 150 through said distributor is through a port 93 around unseated poppet valve 30' and out a port 95 to the fluid outlet 112.

In like manner when a control fluid pressure is applied through port 91' into the interior of chamber 54' the piston and shafts 32 and 32', 62 and 62' will move to the right unseating poppet valves 28' and 30, closing poppet valves 30' and 28, and discharging fluid pressure from said chamber 54 through port 91 to the fluid outlet 112. Fluid flow entering port 90 thus flows around unseated poppet valve 28' and through a port 96 to the bottom of cylinder 150. A return path for said fluid flow from cylinder 150 is provided through port 97 around unseated valve 30 and out port 98 to the fluid outlet 112.

It is to be noted that the flow of fluid through the distributor device is such that pressure exerted against the valves when closed tends to seal them even tighter in their seats, avoiding any possibility of leakage.

O-rings 80 and 80' are provided on the seal assemblies 9 and 9' and the tubular walls 52 and 52' to prevent leakage between adjacent ports in the body 12.

Pilot valve 102 which is identical with pilot valve 102' as shown in FIGURE 2 is a solenoid actuated slide valve having a housing 113 with a port 104 communicating with said fluid inlet, port 105 communicating with the interior of said chamber 54 through port 91 and a port 107 communicating with the outlet 112. A spool 114 with piston 120 is positioned in said housing with a spring 115 adjustably biasing the spool to an upward position preventing fluid flow through ports 104 and 105 of said housing and allowing fluid flow between ports 105 and 107 to carry fluid exhausted from chamber 54 to the fluid outlet 112. Any leakage occurring from port 104 past piston 120 is fed back to the fluid outlet through port 107 so as to avoid inadvertent actuation of piston 58. A solenoid actuator 119 is connected to said housing, said solenoid being responsive to a predetermined signal to draw piston 120 below port 105 in opposition to spring 115 permitting flow between ports 104 and 105 and isolating port 107. The pilot valve 102' which is provided to control the application of fluid flow to chamber 54' operates in a like manner.

A relief by-pass valve 200, as described in my copending U.S. patent application Ser. No. 556,661 filed June 10, 1966, may be provided across the conduits connected to the bottom and top of the cylinder for the purposes outlined therein.

With my present invention, I have provided not only an effective and compact fluid control system in which all problems of leakage are eliminated, but have also provided an effective no leak poppet distributor device with slide action versatility, the principles of which may be adapted for use in various other fluid control systems, and additionally provided a novel system including a block or body with conduits formed therein connecting cavities into which cartridge type assemblies may be mounted and swiftly removed for maintenance or replacement.

Having thus described my invention, what I claim and desire to secure by Letters Patent is:

1. A valve comprising a valve cylinder and a valve piston assembly therein, said valve cylinder having first and second axially spaced inlet ports and first and second axially spaced outlet ports intermediate said inlet ports with said first outlet port near first inlet port, said valve cylinder also having third and fourth inlet-outlet ports axially spaced but adjacent one end thereof, said valve piston assembly comprising a piston rod, a piston attached at one end of said piston rod to travel between said third and fourth ports, first and second longitudinally spaced valve elements slideably mounted on said piston rod, an enlarged section defined by a portion of said piston rod establishing first and second shoulders between said valve elements, first means resiliently biasing said first valve element toward said first shoulder, second means resiliently biasing said second valve element toward said second shoulder, a first valve seat in said cylinder and located between said first inlet and outlet ports, a second valve seat in said cylinder axially spaced from said first valve seat and located between said second inlet and outlet ports, third means hydraulically isolating said first outlet port from said second outlet port, fourth means hydraulically isolating said second inlet port from said third and fourth ports, and fifth means closing the ends of said valve cylinder, said piston, responsive to hydraulic pressure, occupying a first position nearer to said third port and a second position nearer to said fourth port, in said first position said first valve element is held away from said first valve seat against the force of said first means by said first shoulder while said second valve element is seated on said second valve seat by the force of said second means with said second shoulder being spaced therefrom and in said second position the reverse occurring.

2. A valve according to claim 1 wherein said valve piston assembly is a removable cartridge.

3. A valve according to claim 1 wherein the valve elements of said valve piston assembly are poppets.

4. A valve according to claim 3 wherein said poppets and the seats therefor have mating relatively thin deflectable annular portions.

5. A valve according to claim 1 wherein said first and second means are springs.

6. A valve according to claim 1 wherein a pair of such valve piston assemblies are positioned in said cylinder in back-to-back abutting relationship.

7. A valve according to claim 6 wherein the pair of valve piston assemblies are removable cartridges insertable into the cylinder through opposite ends.

8. A valve according to claim 6 wherein the valve elements are poppets.

9. A valve according to claim 8 wherein said poppets and the seats therefor have mating relatively thin deflectable annular portions.

10. In a non-leaking fluid control system comprising a block having a plurality of cavities therein for the reception of valve elements contained in said fluid control system and having a plurality of bores forming conduits connecting said cavities and a plurality of valve assemblies positioned in said cavities, the improvement comprising one of said cavities defining a valve cylinder and a valve piston assembly mounted therein, said valve cylinder having first and second axially spaced inlet ports and first and second axially spaced outlet ports intermediate said inlet ports with said first outlet port near said first inlet port, said valve cylinder also having third and fourth inlet-outlet ports axially spaced but adjacent one end thereof, said piston assembly comprising a piston rod, a piston attached at one end of said piston rod to travel between said third and fourth ports, first and second longitudinally spaced valve elements slideably mounted on said piston rod, an enlarged section defined by a portion of said piston rod establishing first and second shoulders between said valve elements, first means resiliently biasing said first valve element toward said first shoulder, second means resiliently biasing said second valve element toward said second shoulder, a first valve seat in said cylinder and located between said first inlet and outlet ports, a second valve seat in said cylinder axially spaced from said first valve seat and located between said second inlet and outlet ports, third means hydraulically isolating said first outlet port from said second outlet port, fourth means hydraulically isolating said second inlet port from said third and fourth ports, and fifth means closing the ends of said valve cylinder, said piston, responsive to hydraulic pressure, occupying a first position nearer to said third port and a second position nearer to said fourth port, in said first position said first valve element is held away from said first valve seat against the force of said first means by said first shoulder while said second valve element is seated on said second valve seat by the force of said second means with said second shoulder being spaced therefrom and in said second position the reverse occurring.

11. In a non-leaking fluid control system according to claim 10, wherein a pair of such valve piston assemblies are positioned in said cylinder in back-to-back abutting relationship.

12. In a non-leaking fluid control system according to claim 11, wherein the pair of valve piston assemblies are removable cartridges insertible into the cylinder through opposite ends.

13. In a non-leaking fluid control system according to claim 12, wherein the valve elements are poppets.

14. In a non-leaking fluid control system according to claim 13, wherein said poppets and the seats therefor have mating relatively thin deflectable annular portions.

References Cited

UNITED STATES PATENTS

| | | | |
|---|---|---|---|
| 2,471,285 | 5/1949 | Rice | 137—625.68 |
| 2,836,196 | 5/1958 | Gunn | 137—625.64 |
| 2,969,045 | 1/1961 | Clar | 137—625.65 |
| 3,016,917 | 1/1962 | Hunt | 137—625.27 |
| 3,294,120 | 12/1966 | Ruchser | 137—596.16 XR |

HENRY T. KLINKSIEK, *Primary Examiner.*

U.S. Cl. X.R.

137—596.16